United States Patent
Hoffmann

(10) Patent No.: US 8,262,354 B2
(45) Date of Patent: Sep. 11, 2012

(54) METHOD AND APPARATUS FOR LOAD MEASUREMENT IN A WIND TURBINE

(75) Inventor: Till Hoffmann, Osnabrück (DE)

(73) Assignee: General Electric Company, Schenectady, NY (US)

( * ) Notice: Subject to any disclaimer, the term of this patent is extended or adjusted under 35 U.S.C. 154(b) by 957 days.

(21) Appl. No.: 12/198,956

(22) Filed: Aug. 27, 2008

(65) Prior Publication Data

US 2010/0052320 A1    Mar. 4, 2010

(51) Int. Cl.
*B63H 3/01* (2006.01)
(52) U.S. Cl. .......................... 416/61; 415/118
(58) Field of Classification Search .............. 415/9, 14, 415/15, 118; 416/2, 43, 6, 61
See application file for complete search history.

(56) References Cited

U.S. PATENT DOCUMENTS

| | | | |
|---|---|---|---|
| 4,297,076 A * | 10/1981 | Donham et al. | 416/37 |
| 6,940,186 B2 | 9/2005 | Weitkamp | |
| 7,004,724 B2 * | 2/2006 | Pierce et al. | 416/61 |
| 7,160,083 B2 | 1/2007 | Pierce et al. | |
| 7,628,097 B2 * | 12/2009 | Tsuyoshi et al. | 81/57.22 |
| 2006/0140761 A1 * | 6/2006 | LeMieux | 416/61 |

* cited by examiner

*Primary Examiner* — Kiesha Bryant
*Assistant Examiner* — Ali Naraghi
(74) *Attorney, Agent, or Firm* — Global Patent Operation; Douglas D. Zhang

(57) ABSTRACT

The present invention provides a connecting device adapted for connecting a hub and a main shaft of a wind turbine. The connecting device comprises at least one sensor bolt connecting the hub and the main shaft, wherein a stress detection element is mounted inside the sensor bolt. The stress detection element is adapted to detect a length variation of the sensor bolt and to output a sensor signal indicative of the length variation of the sensor bolt. A signal output device is used for outputting the sensor signal which is indicative of a stress applied to the sensor bolt.

17 Claims, 10 Drawing Sheets

METHOD AND APPARATUS FOR LOAD MEASUREMENT IN A WIND TURBINE

BACKGROUND

The present disclosure relates to wind turbines, and in particular relates to the reduction of load caused by different moments acting on a wind turbine. Specifically, the present disclosure relates to a wind turbine including a rotor having a plurality of rotor blades and a main shaft, and a hub, wherein the hub and the main shaft are connected by hub bolts.

Wind turbines are of increasing importance as an environmentally safe and relatively inexpensive alternative energy source. The increased demand for an improved wind turbine performance has triggered efforts concerning an optimum adjustment of the rotor blades of the wind turbine with respect to a minimum load applied to the entire wind turbine. The rotor blades transform wind energy into a rotational torque or force that drives one or more generators which are rotationally coupled to the rotor through a gear box. Loading moments across wind turbine rotors result from vertical and horizontal wind shears, yaw misalignment and turbulence. Load applied to the entire wind turbine can be provided in form of a yaw moment which results in a force about a vertical axis of the wind turbine structure. Furthermore, a pitching moment of the turbine's wind rotor may induce bending moments into the main shaft of the rotor such that a plane in which the rotor blades rotate is tilted about an axis perpendicular to the vertical axis of the wind turbine.

Most wind turbines provide an adjustment of a pitch angle of the rotor blades. The pitch angle is the angle of the airfoil with respect to the incoming air flow wherein an adjustment of the pitch angle is performed about the airfoil axis.

SUMMARY

According to one aspect of the disclosure a connecting device is provided, the connecting device being adapted for connecting a hub and a main shaft of a wind turbine, including at least one sensor bolt connecting the hub and the main shaft, including a stress detection element mounted inside the sensor bolt, the stress detection element being adapted to detect a length variation of the sensor bolt and to output a sensor signal indicative of the length variation of the sensor bolt; and a signal output device for outputting the sensor signal which is indicative of a stress applied to the sensor bolt.

According to another aspect of the disclosure a wind turbine is provided, the wind turbine including a rotor having a main shaft and at least one rotor blade, and a hub, said wind turbine further including a plurality of hub bolts that fix the main shaft to the hub, wherein at least one hub bolt is configured as a sensor bolt adapted to detect a strain acting along its longitudinal axis and to output a sensor signal indicative of the detected stress, and a signal processing unit that processes the sensor signal such that a load applied at the wind turbine can be determined.

According to yet another aspect of the disclosure a method is provided for reducing load in a wind turbine, the wind turbine including a rotor having a main shaft and at least one rotor blade with an adjustable pitch angle, wherein the method includes setting a pitch angle of the at least one rotor blade, detecting bending moments acting on the main shaft of the wind turbine, and adjusting the pitch angle of the at least one rotor blade on the basis of the detected bending moments such that the bending moments are reduced.

Further aspects, advantages and features of the present disclosure are apparent from the dependent claims, the description and the accompanying drawings.

BRIEF DESCRIPTION OF THE DRAWINGS

A full and enabling disclosure, including the best mode, to one of ordinary skill in the art, is set forth more particularly in the remainder of the specification, including reference to the accompanying figures wherein.

DETAILED DESCRIPTION

Reference will now be made in detail to the various embodiments, one or more examples of which are illustrated in the figures. Each example is provided by way of explanation of the disclosure and is not meant as a limitation. For example, features illustrated or described as part of one embodiment can be used on or in conjunction with other embodiments to yield yet a further embodiment. It is intended that the present disclosure includes such modifications and variations.

Figure 1:
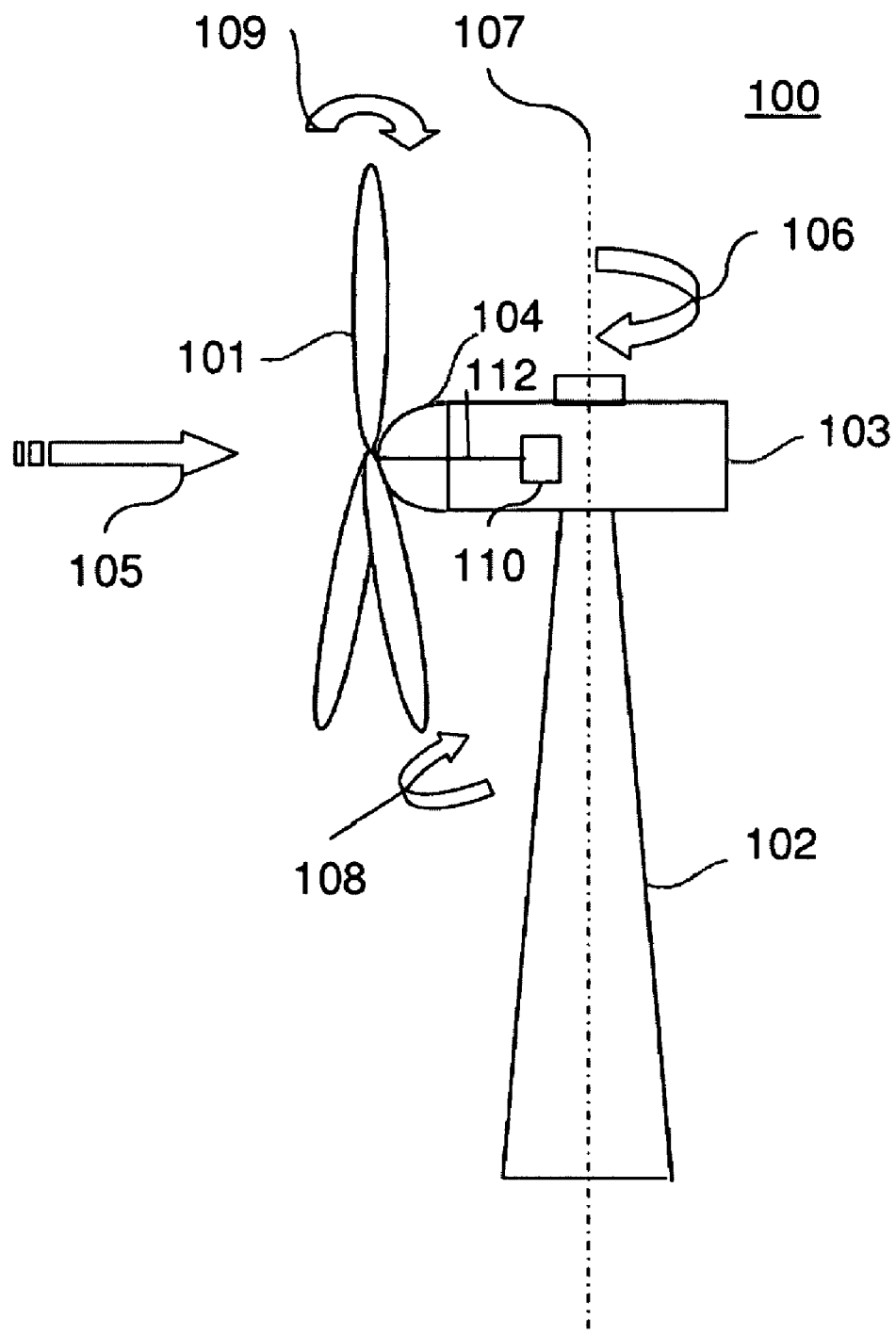
FIG. 1 shows a schematic set-up of a wind turbine having a rotor with three rotor blades.

FIG. 1 schematically shows a wind turbine 100 including a rotor having a main shaft 112 and a plurality of rotor blades 101, and a hub 104. Typically, wind turbines include three rotor blades but it will be understood by those skilled in the art that the present disclosure also applies to wind turbines having any other number of rotor blades, particularly including only one or two rotor blades. The wind turbine 100 further includes a plurality of hub bolts for fixing the main shaft 112 to the hub 104. A rotation sensor 110 is connected to the main shaft 112. A machine nacelle 103 is rotatably positioned on top of a tubular tower 102 such that the nacelle may be adjusted in accordance with the incoming wind direction 105. The hub 104 is the central part of the rotor having three rotor blades 101. Although the wind turbine 100 illustrated in FIG. 1 includes three rotor blades 101, any number of rotor blades 101 may be provided. In some configurations, various components are housed in the machine nacelle 104 atop the tubular tower 102 of the wind turbine 100.

Figure 2:
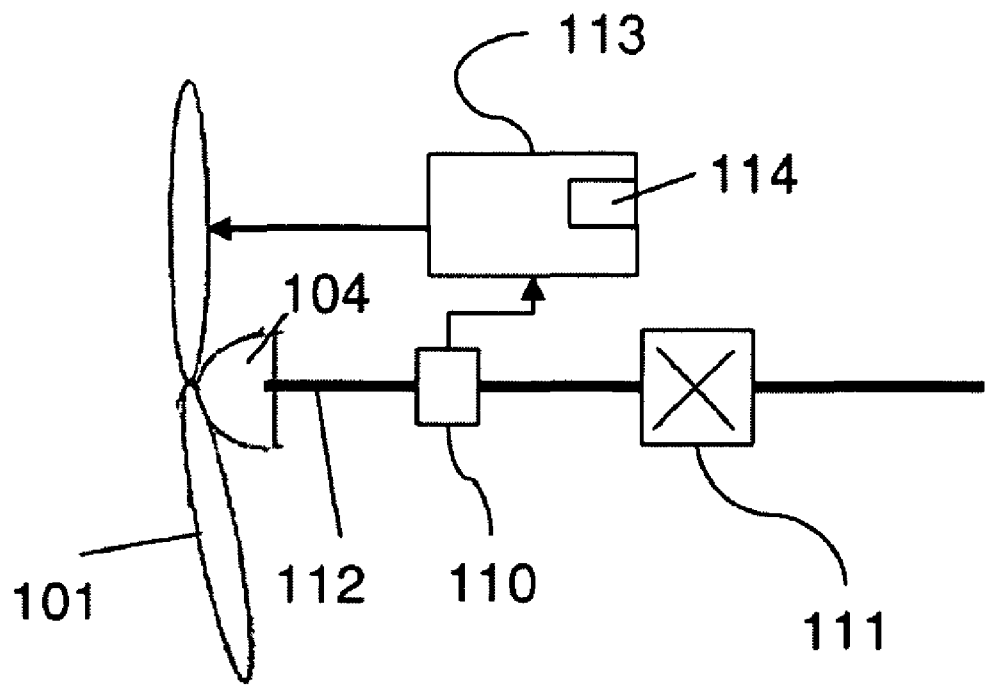
FIG. 2 is a detailed view of typical parts of a machine nacelle of the wind turbine.

FIG. 2 is an enlarged view of typical parts of the machine nacelle 103 of the wind turbine 100. As shown in FIG. 2, a control system 113 provides pitch control signals for a variable rotor blade pitch drive in order to control the pitch angle 108 of one or more rotor blades 101. The rotation sensor 110 is connected to the main shaft 112 of the rotor such that a rotational position of the rotor blades 101 may be determined. A gear box 111 is provided in order to increase the rpm (revolutions per minute) value of the main shaft 112 to a value suitable for driving a generator (not shown). The output signal of the rotation sensor 110 may be used to control the adjustment of the pitch angle 108 by means of the control system 113 including a signal processing unit 114. Typically, the signal may also be used to control the generator in addition or instead of and exclusive of the pitch motors. The generator control may be performed by control system 113 and/or by another control system (not shown).

In operation, loads are applied to the entire wind turbine 100 due to the force of the incoming wind 105 (see FIG. 1). A first load applied to the entire wind turbine 100 is a yaw moment 106, i.e. a moment attempting to rotate the machine nacelle 103 about a vertical axis 107 of the tubular tower 102. A yaw angle may be adjusted according to changing incoming wind directions 105.

Furthermore, a pitching moment 109 is applied to the wind turbine, e.g. caused by wind shears such that the entire wind turbine 100 and, especially the wind rotor, is deflected by a pitching moment 109.

In order to reduce load on the components, the present disclosure advantageously utilizes the turbines capability of adjusting the pitch angles 108 of the individual rotor blades. In order to adjust the pitch angle 108, a pitch control signal has to be provided which is derived from various sensor signals measured by detection elements such as angle sensors and torque sensors provided at moving parts of the rotor. According to one embodiment, a sensor device for stress measurement is provided directly at the connection point between the hub 104 and the main shaft of the rotor.

Figure 3:
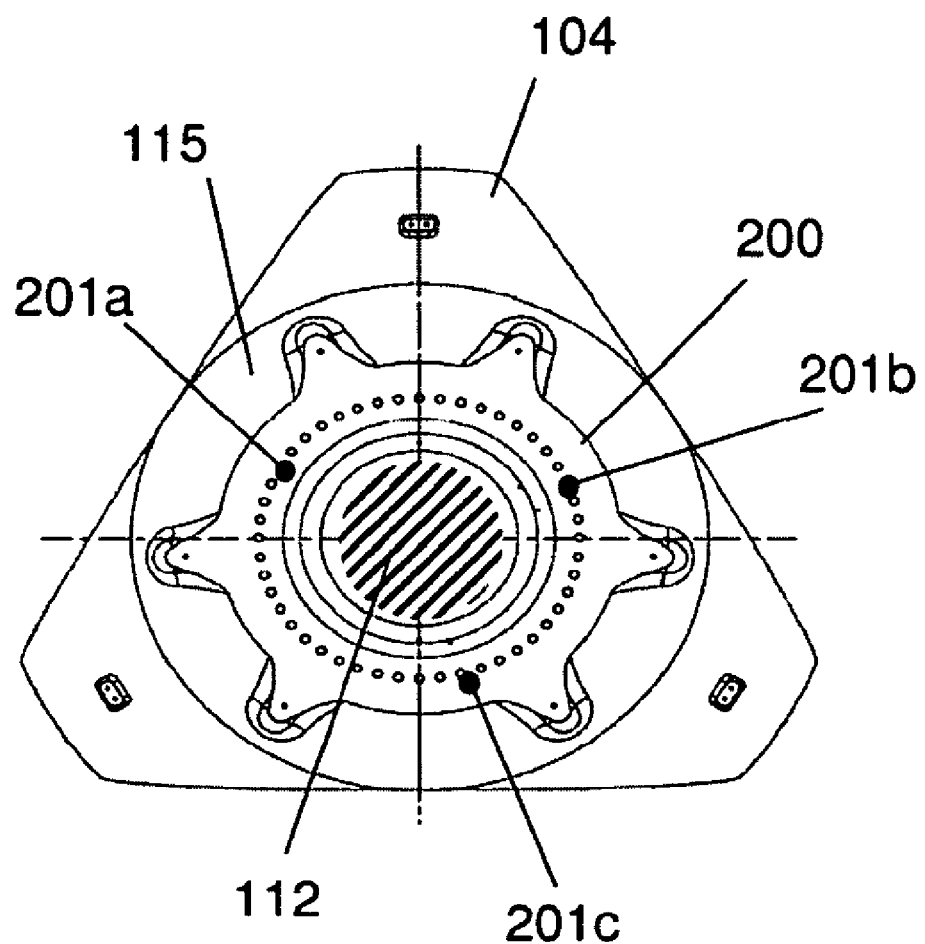
FIG. 3 is a sectional view of a hub, viewed from the main shaft side.

FIG. 3 is a cross-sectional representation of the hub 104, viewed from the main shaft side. The main shaft 112 is mounted at the hub 104 by means of a mounting disc 115. A plurality of hub bolts 200 are provided in order to fix the main shaft 112 to the hub 104 via the mounting disc 115. At least one hub bolt 201a, 201b, 201c is configured as a sensor bolt. The sensor bolt includes a stress detection element mounted inside the sensor bolt, such that a sensor device for stress measurement is formed.

As depicted in FIG. 3, three individual hub bolts are replaced by sensor bolts 201a, 201b and 201c. In the embodiment shown in FIG. 3, the three sensor bolts 201 are circumferentially equispaced around the mounting disc 115. While three sensor bolts 201a, 201b and 201c are shown to be mounted at the hub 104 instead of hub bolts 200, the number of sensor bolts 201 mounted at the hub 200 is not restricted by the present disclosure.

Furthermore, it is possible to provide different sensor bolts at different angular positions, wherein the different sensor bolts exhibit different measurement sensitivities.

Figure 4:
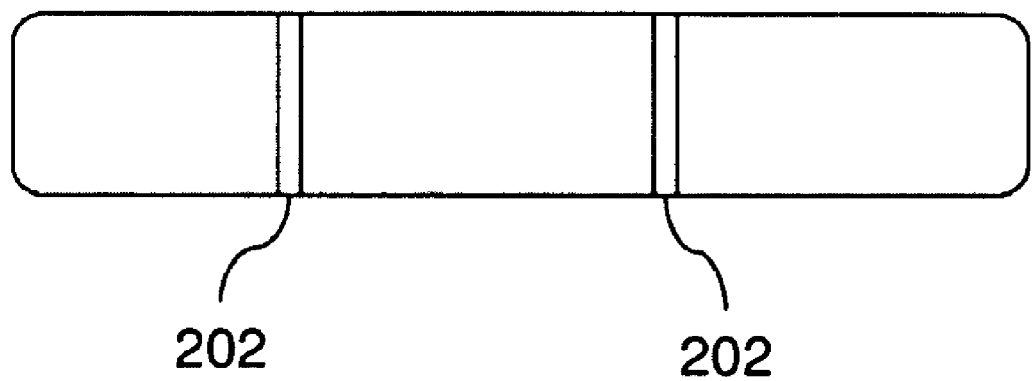
FIG. 4 is a cross-section of a hub bolt which has two thread runouts.
Figure 5:
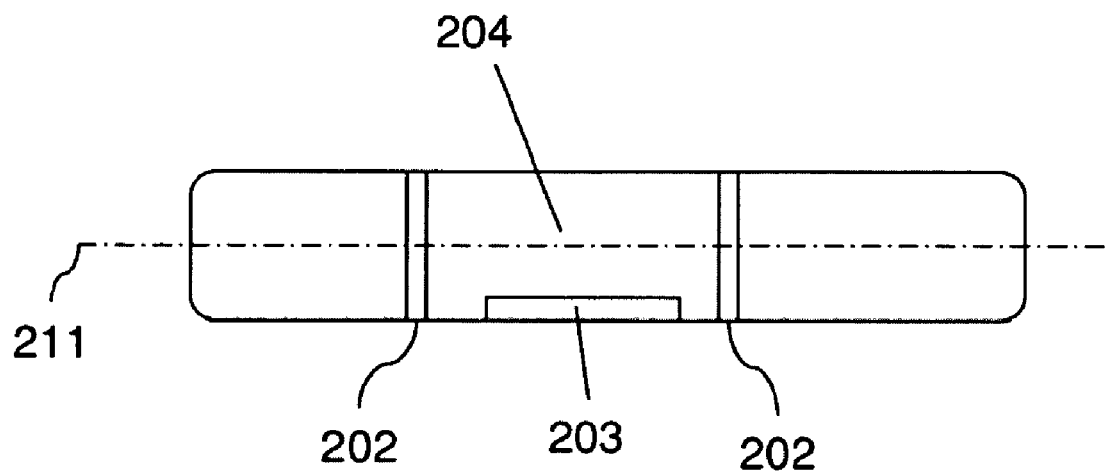
FIG. 5 is a cross-sectional view of a sensor bolt with a strain detection element in the interior thereof according to an embodiment.

FIG. 4 is a cross-section of a hub bolt 200 according to an embodiment. The hub bolt includes left and right thread runouts 202 which are used to fix the hub 104 and the main shaft, respectively. As compared to the hub bolt 200 shown in FIG. 4, FIG. 5 illustrates a sensor bolt 201, the exterior of which is constructed similar to the hub bolt 200 shown in FIG. 4. According to a first embodiment, the sensor bolt 201 includes an interior space 204 in which a stress detection element 203 is arranged. This stress detection element 203 is used to detect length variations of the sensor bolt with respect to its central longitudinal axis 211. Thus, stress and bending moments are detectable by means of the sensor bolt. In the following, embodiments relating to strain measurement are described. In other words, the stress detected by the sensor bolt is strain. It will be understood that strain, however, is only one of many different kinds of stress which may be detected by the sensor bolt. For example, also bending, tilting or torsional moments acting on sensor bolt 201 may be detected. Therefore, the reference to strain measurement in the following examples should not be construed as limiting the scope of the present disclosure but should be understood as an example of the stress that may be measured.

Figure 6:
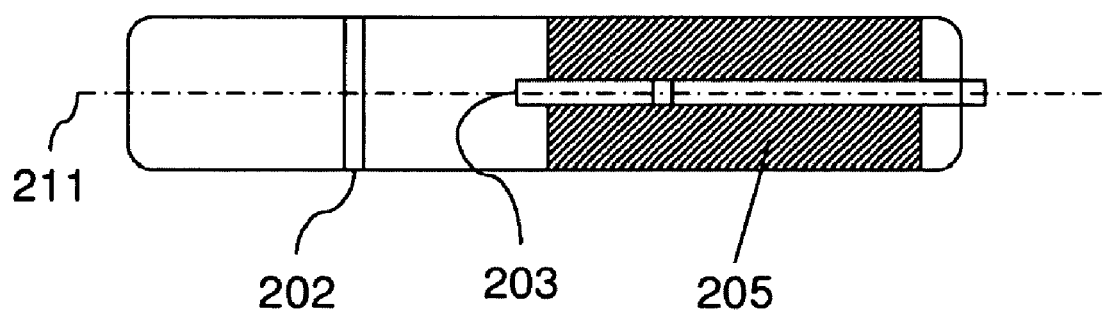
FIG. 6 is a cross-sectional view of a sensor bolt having a strain detection element according to another embodiment.

FIG. 6 exhibits a sensor device for strain measurement according to another embodiment. Like to the sensor device shown in FIG. 5, the sensor device shown in FIG. 6 includes a strain detection element 203 which in this case is located on the longitudinal axis 211 of the sensor bolt 201. In order to position the strain detection element 203 on the longitudinal axis 211 of the sensor bolt 201, a supporting element 205 is provided such that a length variation of the sensor bolt 201 as a whole is transferred to the strain detection element 203. For example, the supporting element 205 is provided as a ferrule which is fixed to both the strain detection element and an inner wall of the sensor bolt 201.

It is noted that the strain detection elements 203 described with respect to FIGS. 5 and 6 are strain gauge sensors which provide a resistance variation indicative of the length variation. Typically, the resistance variation of such sensors is a function of the stress. As it is known to the skilled person, such resistance variations may be detected by using bridge circuits. By providing more than one strain gauge in one individual sensor bolt and by subjecting not all of the strain gauges to a length variation it is possible to provide temperature compensation at the sensor device. The temperature compensation is achieved if at least one reference strain gauge exhibits a length variation caused by a temperature variation alone, and if at least one detection strain gauge exhibits a length variation caused by said temperature variation and a length variation of the sensor bolt. Thus said length variation caused by a temperature variation alone can be eliminated and a temperature-compensated output signal may be obtained from the sensor bolt.

Furthermore it is noted that the supporting element 205 in the interior of the sensor bolt 201 shown in FIG. 6 may be applied to the sensor bolts shown in FIGS. 5 and 6 as well.

According to an embodiment, the strain detection element is a resistive strain gauge attached to an inner surface of the sensor bolt such that the sensor signal is an electrical signal.

Figure 7:
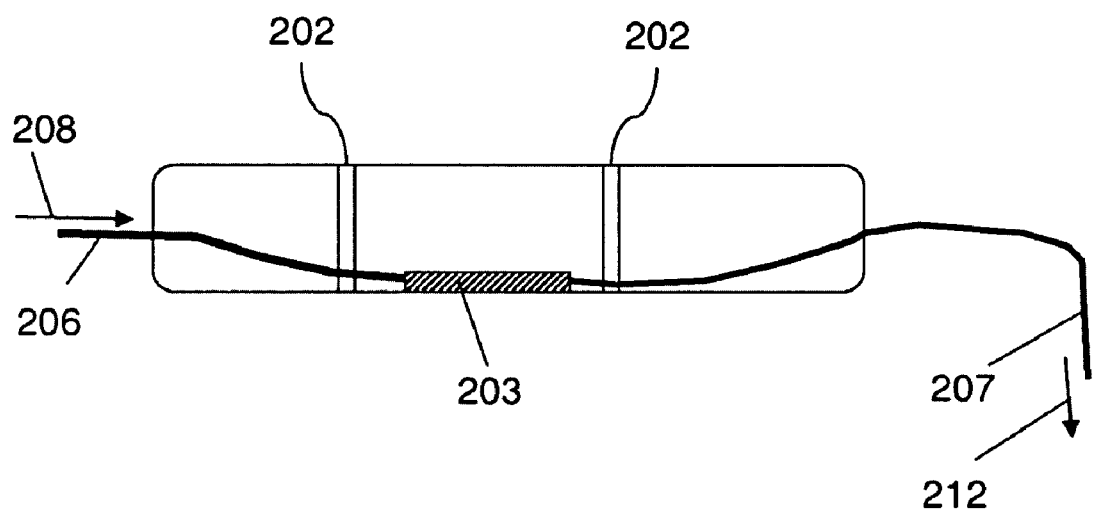
FIG. 7 is a cross-sectional view of a sensor bolt having an optical strain detection element according to yet another embodiment.

FIG. 7 illustrates another embodiment. The strain detection element 203 in this case is provided as a fiber-optic Bragg grating attached to an inner surface of the bolt such that the sensor signal is an optical signal. A Bragg grating is a reflective index structure written into an optical fiber wherein the structure is modified when a length variation of the optical fiber is provided. As the optical fiber is connected to the sensor bolt 201, it is thus possible to measure the length variation of the sensor bolt using the fiber-optic Bragg grating. A variation of a structure within the fiber-optic Bragg grating indicates forces and moments which have been induced into the optical fiber. The fiber-optic Bragg grating sensor furthermore includes an optical input fiber 206 and an optical output fiber 207.

Optical radiation 208, e.g. laser light, is guided through the optical fiber and, as a function of a length variation of the sensor bolt 201 and the strain detection elements 203, the output light 212 is modified with respect to its frequency distribution. As persons of ordinary skill are familiar with the fiber-optic Bragg gratings and the functions thereof, a detailed description of the measurement effect based on fiber-optic Bragg gratings is omitted here.

Figure 8:
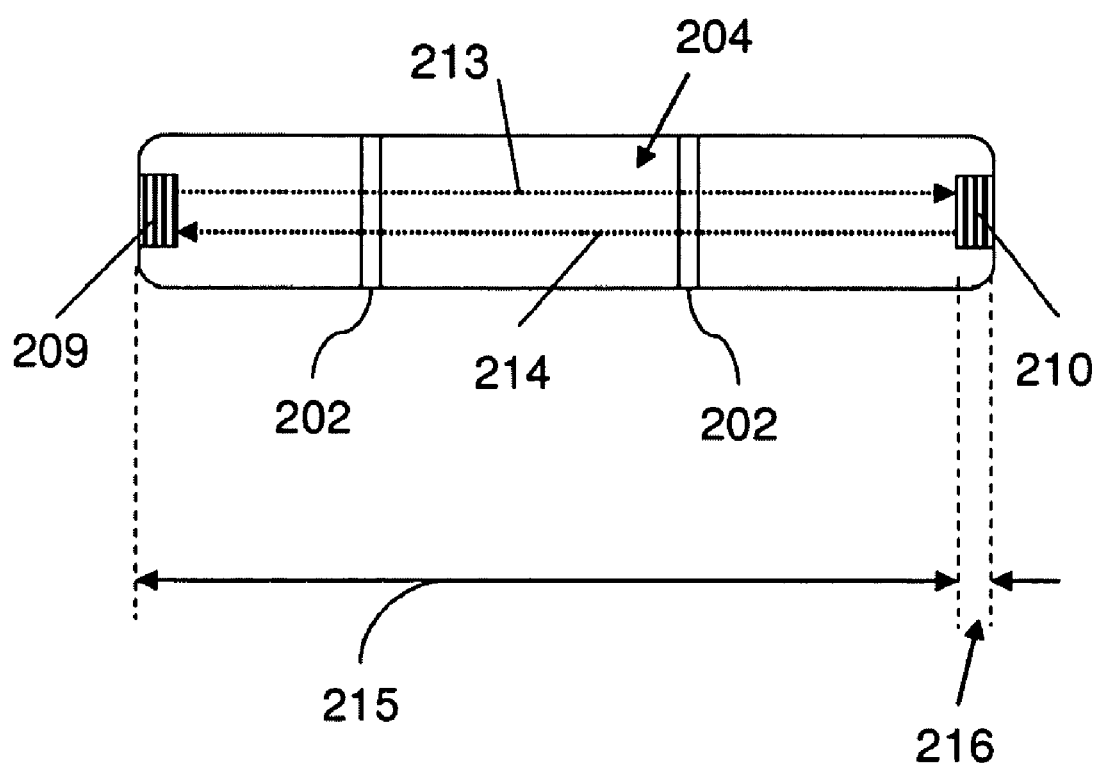
FIG. 8 is a cross-sectional view of a sensor bolt having signal transceiving and reflection device for measuring a length variation of the sensor bolt, according to yet another embodiment.

FIG. 8 shows another embodiment of a sensor device according to an embodiment. In the device shown in FIG. 8, an interior space 204 of the sensor bolt 201 is provided where measurement beams may be transmitted between two interior end faces of the sensor bolt. According to the embodiment of a sensor bolt 201 shown in FIG. 8, the strain detection element is a distance measurement unit adapted to measure a distance, in the longitudinal direction of the sensor bolt, between reference elements within the sensor bolt. According to an embodiment, a signal transceiving device 209 and a signal reflection device 210 are provided. It will be understood by those skilled in the art that the signal reflection device 210 may be formed by the end portion of the bolt itself. These devices 209, 210 may act as reference elements within the sensor bolt 201 for a detection of a length variation of the sensor bolt 201.

The above sensor operates as follows. A first sensor beam 213 is emitted from the signal transceiving device 209 and is directed towards the signal reflection device 210. At the signal reflection device 210, the first sensor beam 213 is reflected and converted into a second sensor beam 214 which is passed through the interior space 204 of the sensor bolt towards the signal transceiving device 209. From the phase change or time-of-flight duration acquired by the first sensor beam 213 and the second sensor beam 214, an absolute distance 215 and a distance variation 216, respectively, of the sensor bolt 201 may be detected.

According to a further embodiment, the distance measurement unit is a laser distance measurement unit.

According to yet another embodiment, the distance measurement unit is an ultrasonic distance measurement unit.

According to yet another embodiment, the sensor bolt 201 includes at least one additional detection element which is to subject to a length variation such that a temperature compensation for the sensor device is obtained. The output signals of the sensor device are supplied to a signal processing unit (not shown) for processing the sensor signal.

According to yet another embodiment, the wind turbine includes a pitch angle adjustment unit for adjusting the pitch angle 108 of at least one rotor blade 101 of the rotor of the wind turbine 100 as a function of the processed sensor signal.

According to yet another embodiment, different sensor bolts may be provided in order to obtain different sensor sensitivities such that the measurement range may be broadened. An effective measurement range may be obtained which is the sum of the measurement ranges provided by individual sensor bolts 201.

Figure 9:
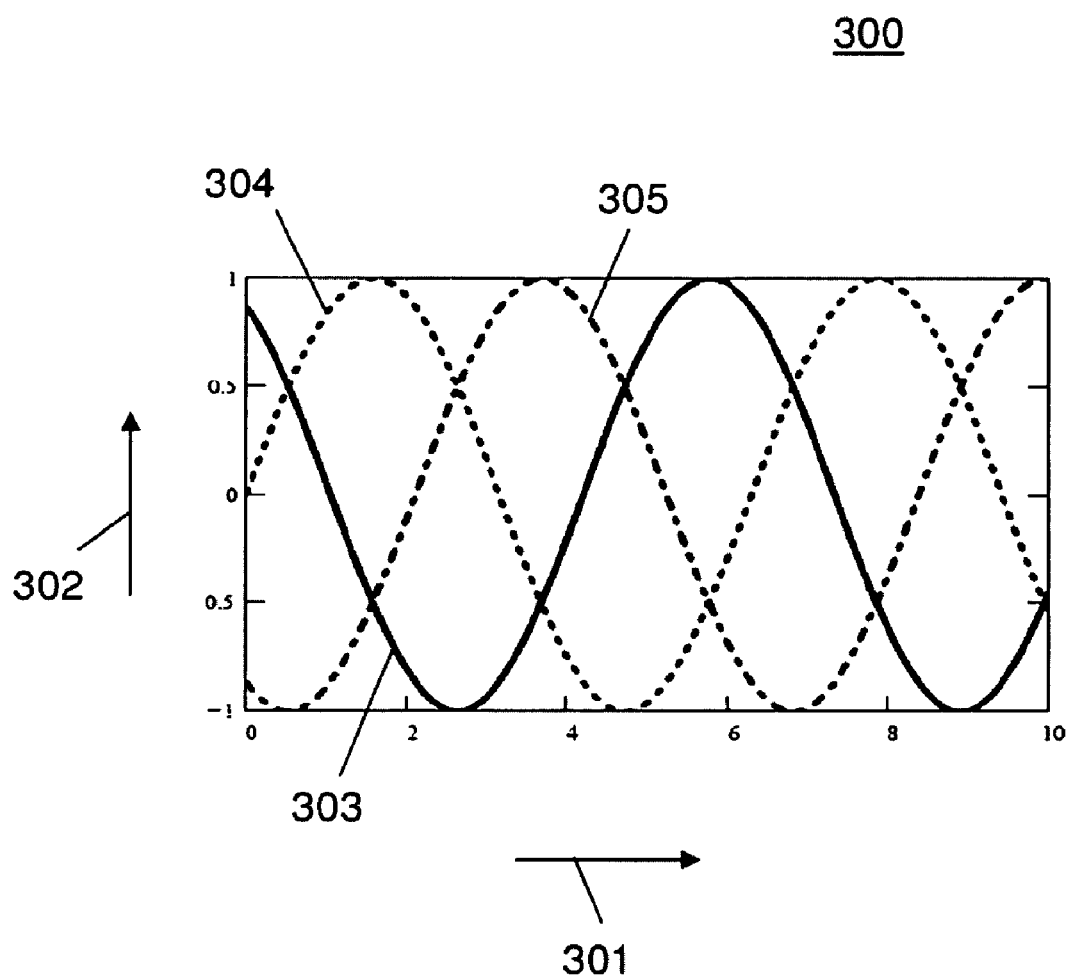
FIG. 9 illustrates, as an example, amplitudes of length variations of three different sensor bolts measured at circumferentially equispaced positions at the hub.

FIG. 9 is a graph 300 illustrating different sensor signals obtained from three different sensor bolts which replace hub bolts 200 of a hub 104 shown in FIG. 3. In the graph shown in FIG. 9, reference numeral 301 denotes a rotational position of the rotor in units of rad, wherein reference numeral 302 denotes an amplitude of a length variation of the respective sensor bolts 201a, 201b and 201c (see FIG. 3) in relative units.

As shown in FIG. 9, the length variations follow the rotation of the hub wherein the amplitude varies repeatedly. Reference numeral 303 is the output signal of a first sensor bolt 201a, reference numeral 304 denotes the output signal of a second sensor bolt 201b and reference numeral 305 represents the output signal of a third sensor bolt 201c.

As the sensor bolts are angularly spaced by 120 degrees, the output signals of the strain detection elements are angularly spaced by 120 degrees as well. When a continuous torque, i.e. a yaw moment 106 and/or a pitching moment 109, is applied to the rotor blades 101 of the rotor of the wind turbine 100, a recurring lengthening and shrinking of the sensor bolts (and of the hub bolts 200 as well) occurs such that the sinusoidal curves are obtained, as shown in FIG. 9. Thus the pitching moments 109 and the yaw moments 106 can be determined from the variation of the sensor signals 303, 304 and 305.

Figure 10:
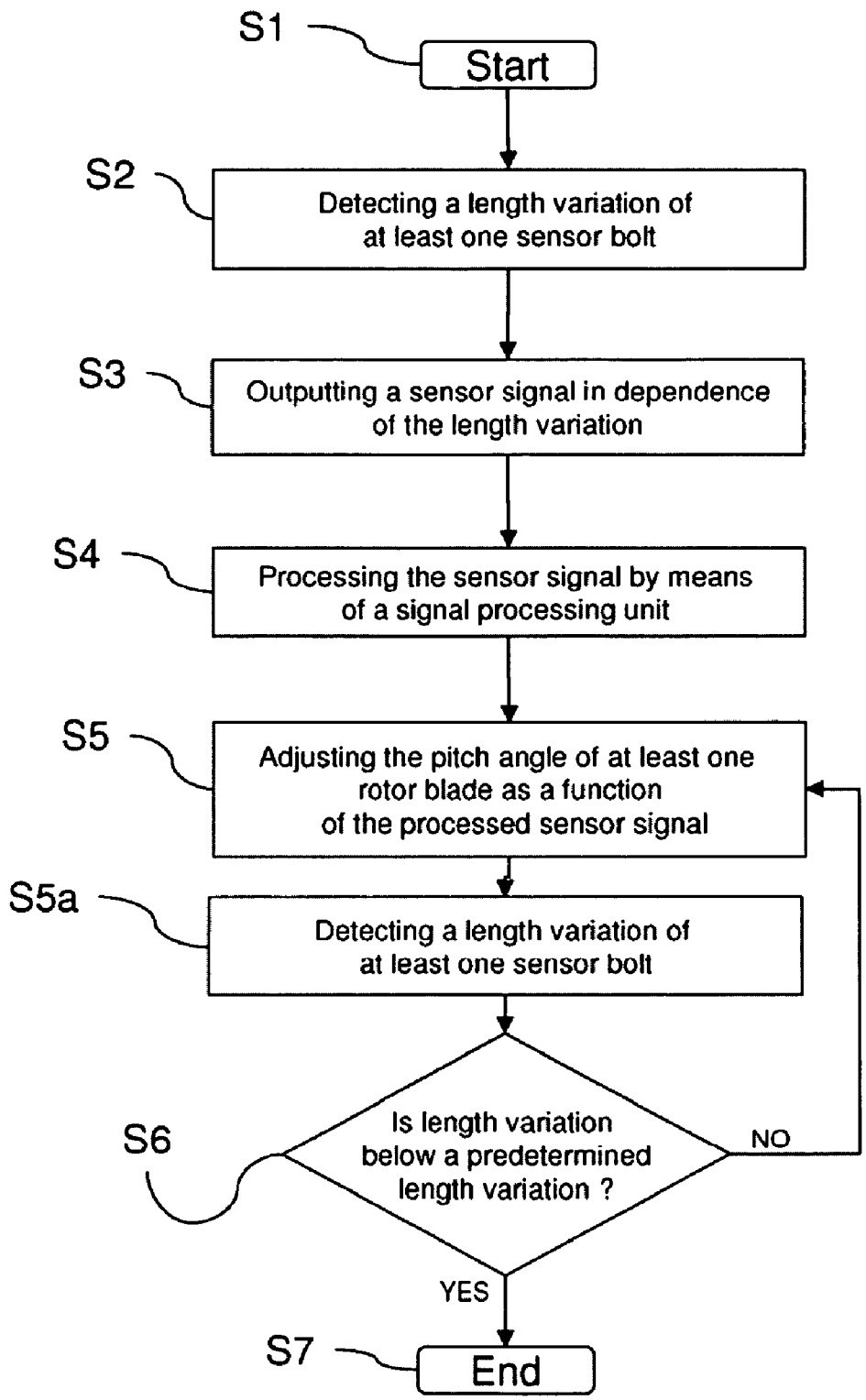
FIG. 10 is a flow chart depicting a method for reducing load in a wind turbine using sensor bolts according to one of the embodiments.

FIG. 10 is a flow chart depicting a method for reducing load in a wind turbine according to an embodiment. At step S1, the operation is started. Then, at step S2, a length variation of at least one sensor bolt 101 is detected. Then, the operation proceeds to step S3 where a sensor signal which is indicative of the length variation is output. The sensor signal is processed at a step S4, wherein the signal processing is performed by means of a signal processing unit (not shown). At step S5, the pitch angle 108 of at least one rotor blade 101 is adjusted as a function of the processed sensor signal.

Then it is determined, at a step S6, whether the length variation detected at step S2 above is below a predetermined length variation or not. If it is determined, at the step S6, that the length variation is above a predetermined length variation, the operation proceeds to step S5 mentioned above, and the pitch angle of at least one rotor blade is adjusted again and the length variation of the at least one sensor bolt is measured again (step S5a).

On the other hand, if it is determined at step S6 that the length variation is below a predetermined length variation ("YES" at step S6), then the operation is ended at step S7.

Thus, by transforming the electrical signals into control signals, it is possible to calculate bending moments in the main shaft. The signals can be used as an input for a closed-loop control of main shaft bending moments of the wind turbine 100. In addition to that, the sensor signals, i.e. those obtained according to FIG. 9 described above, can be correlated to the measurement of the rotational position obtained by the rotation sensor 110 mentioned with reference to FIG. 1.

This written description uses examples to disclose the invention, including the best mode, and also to enable any person skilled in the art to make and use the invention. While various specific embodiments have been disclosed, those skilled in the art will recognize that the disclosure can be practiced with modification within the spirit and scope of the claims. Especially, mutually non-exclusive features of the embodiments described above may be combined with each other. The patentable scope of the disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A connecting device configured to connect a hub and a main shaft of a wind turbine, comprising:
at least one sensor bolt connecting the hub and the main shaft, comprising:
a stress detection element mounted inside the sensor bolt, the stress detection element being configured to detect a length variation of the sensor bolt and to output a sensor signal as a function of the length variation of the sensor bolt; and
a signal output device that outputs the sensor signal which is indicative of a stress applied to the sensor bolt, wherein the stress detection element is a distance measurement unit configured to measure a distance, in the longitudinal direction of the sensor bolt, between reference elements within the sensor bolt.

2. The connecting device according to claim 1, wherein the stress detection element is configured to detect strain applied to the sensor bolt.

3. The connecting device in accordance with claim 1, wherein the distance measurement unit is a laser distance measurement unit.

4. The connecting device in accordance with claim 1, wherein the distance measurement unit is an ultrasonic distance measurement unit.

5. The connecting device in accordance with claim 1, wherein the sensor bolt comprises at least one additional stress detection element which is not subject to a length variation such that a temperature compensation is obtained.

6. A wind turbine comprising a rotor comprising a main shaft and at least one rotor blade, and a hub, said wind turbine further comprising:
   a plurality of hub bolts that fix the main shaft to the hub, wherein at least one hub bolt is configured as a sensor bolt configured to detect a stress acting along its longitudinal axis and to output a sensor signal indicative of the detected stress; and
   a signal processing unit that processes the sensor signal such that a load applied at the wind turbine can be determined.

7. The wind turbine in accordance with claim 6, wherein the sensor bolt comprises a stress detection element mounted inside the sensor bolt, the stress detection element being configured to detect a length variation of the sensor bolt and to output a sensor signal as a function of the length variation of the sensor bolt.

8. The wind turbine in accordance with claim 6, further comprising a pitch angle adjustment unit that adjusts a pitch angle of the at least one rotor blade of the rotor on the basis of the processed sensor signal.

9. The wind turbine in accordance with claim 7, wherein the stress detection element is a resistive strain gauge attached to an inner surface of the sensor bolt, and wherein the sensor signal is an electrical signal.

10. The wind turbine in accordance with claim 7, wherein the stress detection element is a fiber-optic Bragg grating attached to an inner surface of the sensor bolt and wherein the sensor signal is an optical signal.

11. The wind turbine in accordance with claim 7, wherein the stress detection element is a distance measurement unit configured to measure a distance, in the longitudinal direction of the sensor bolt, between reference elements within the sensor bolt.

12. The wind turbine in accordance with claim 11, wherein the distance measurement unit is a laser distance measurement unit.

13. The wind turbine in accordance with claim 11, wherein the distance measurement unit is an ultrasonic distance measurement unit.

14. A method for reducing load in a wind turbine, the wind turbine comprising a rotor comprising a main shaft and at least one rotor blade with an adjustable pitch angle, wherein the method comprises:
   setting a pitch angle of the at least one rotor blade;
   detecting bending moments acting on the main shaft of the wind turbine; and
   adjusting the pitch angle of the at least one rotor blade on the basis of the detected bending moments such that the bending moments are reduced,
   wherein the main shaft and a hub of the wind turbine are connected by means of hub bolts, and wherein at least one hub bolt is configured as a sensor bolt comprising a stress detection element mounted inside the sensor bolt, and
   wherein the method further comprises determining the bending moments by a length variation of the sensor bolt.

15. The method in accordance with claim 14, wherein the length variation of the sensor bolt is detected by means of the stress detection element mounted inside the sensor bolt, and by outputting a sensor signal as a function of the detected length variation by means of a signal output device.

16. The method in accordance with claim 15, wherein the sensor signal is processed by means of a signal processing unit, and the pitch angle of the at least one rotor blade is adjusted on the basis of the processed sensor signal such that the length variation of the at least one sensor bolt is reduced.

17. The method in accordance with claim 14, wherein different measurement sensitivities are provided by means of different sensor bolts used for connecting the main shaft to the hub.

* * * * *